UNITED STATES PATENT OFFICE.

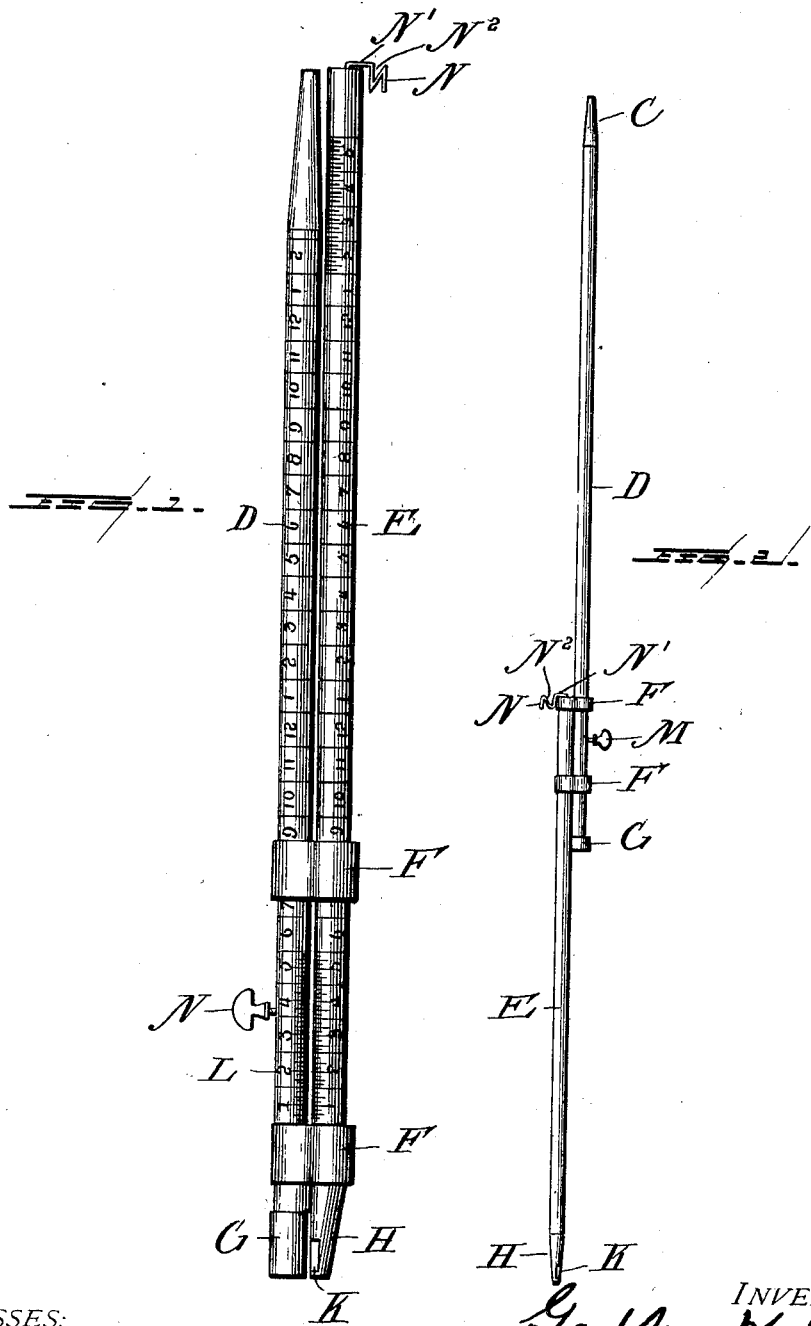

GODFREY KOPP, OF NEW ORLEANS, LOUISIANA.

PICTURE-HANGER.

SPECIFICATION forming part of Letters Patent No. 696,981, dated April 8, 1902.

Application filed November 12, 1900. Serial No. 36,297. (No model.)

*To all whom it may concern:*

Be it known that I, GODFREY KOPP, a citizen of the United States of America, residing at New Orleans, in the parish of Orleans and State of Louisiana, have invented certain new and useful Improvements in Picture-Hangers, of which the following is a specification, reference being had therein to the accompanying drawings.

This invention relates to new and useful improvements in picture-hangers, and is clearly illustrated in the accompanying drawings, in which—

Figure 1 is a plan view of my invention, showing the extensible handle closed. Fig. 2 is an edge view of the same with the handle extended.

Referring to the drawings by letter, D and E designate the extensible handle-sections, having collars or straps F F secured to one handle-section, as D, and embracing and holding the handle-section E to section D, but allowing said handle E to slide through the collars when it is desired to extend the same, as shown in Fig. 2. A hook N is mounted in the end of the section E, a ferrule G being fitted over said end. The shank portion of this hook is bent at right angles at a location adjacent to the point where it emerges from the section E and normally rests against the end of the section when the outer hooked end is drawn down by the weight of a picture hanging thereon. The shank portion of said hook is bent again at right angles at $N'$ and disposed over the edge of the end of said section E, and is then bent U-shaped, forming the hook portion, while its free end is bent back into a position parallel with the longitudinal edge of the section E, a barb or point $N^2$ projecting beyond the open end of the hook for the purpose of retaining a picture-cord in the hook. As the outer end of the hook is parallel with the section, it may be held flat against the wall of a room as the picture is being hung. To hold the handle-sections in adjusted positions, a thumb-screw M is employed, and on the faces of the sections are ruled scales.

Whenever it may be found necessary to use the hook N for hanging pictures at a greater height than could be reached when the two handles are closed, as shown in Fig. 1, the handle E may be reversed from the position shown in Fig. 2, and the end having the ferrule H may be passed through the collars F and held by thumb-screw M. When thus adjusted, the broom A is removed from the handle, and of course the two handles thus secured together are inverted when in use.

It will be observed that the hook N is substantially S-shaped outside of the ferrule G on the end of handle-section E and that when the handle-sections are extended to their farthest limit one of said collars F will come in contact with horizontal portion of the shank portion of said hook N, as shown in Fig. 2.

What I claim is—

A picture-hanger, comprising the extensible handles D and E, the collars F F, secured to said handle D and embracing handle E, the thumb-screw M, for locking the two handles together, the hook N mounted in the end of handle E, bent at right angles adjacent to the point where it emerges from the end of said handle, and its shank portion disposed in a plane parallel to the end of handle E, thence bent at right angles over the end of the handle carrying the same, and formed into a hook with the extreme end thereof bent to form a spur and in a plane parallel with the length of the handles, as set forth.

In testimony whereof I affix my signature in presence of two witnesses.

GODFREY KOPP.

Witnesses:
ALPHONSE J. CUNEO,
EMILE D. GONZALES.